United States Patent
Park

(10) Patent No.: US 8,004,645 B2
(45) Date of Patent: Aug. 23, 2011

(54) LIQUID CRYSTAL DISPLAY DEVICE WITH INTEGRATED CIRCUIT COMPRISING SIGNAL RELAY, POWERS AND SIGNAL CONTROL

(75) Inventor: Chang Keun Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 812 days.

(21) Appl. No.: 12/003,487

(22) Filed: Dec. 26, 2007

(65) Prior Publication Data

US 2008/0218647 A1   Sep. 11, 2008

(30) Foreign Application Priority Data

Mar. 7, 2007   (KR) .................. 10-2007-0022367

(51) Int. Cl.
G02F 1/1345   (2006.01)
G09G 3/36   (2006.01)

(52) U.S. Cl. ........ 349/150; 349/149; 349/151; 349/152; 345/104

(58) Field of Classification Search .......... 349/149–152; 345/104

See application file for complete search history.

(56) References Cited

U.S. PATENT DOCUMENTS

| 5,774,099 | A | 6/1998 | Iwasaki et al. | |
| 6,806,862 | B1 * | 10/2004 | Zhang et al. | 345/103 |
| 6,924,794 | B2 * | 8/2005 | Moon | 345/204 |
| 7,728,916 | B2 * | 6/2010 | Sohn | 349/43 |
| 2003/0043104 | A1 * | 3/2003 | Lee et al. | 345/92 |
| 2003/0090614 | A1 * | 5/2003 | Kim et al. | 349/149 |
| 2004/0165138 | A1 * | 8/2004 | Hwang et al. | 349/152 |

FOREIGN PATENT DOCUMENTS

| CN | 1338719 | 3/2002 |
| CN | 1523409 | 8/2004 |
| CN | 1561469 | 1/2005 |
| EP | 1 450 405 | 8/2004 |
| JP | 11-337972 | 12/1999 |
| JP | 2002-258765 | 9/2002 |
| JP | 2003-186045 | 7/2003 |
| JP | 2003-233362 | 8/2003 |
| JP | 2004-252466 | 9/2004 |
| WO | WO 03/042964 | 5/2003 |

* cited by examiner

*Primary Examiner* — Hoan C Nguyen
(74) *Attorney, Agent, or Firm* — McKenna Long & Aldridge LLP

(57) ABSTRACT

A liquid crystal display device includes: a liquid crystal panel including a plurality of pixel cells formed at every regions defined by a plurality of data lines and gate lines; a gate built-in circuit, built-in the liquid crystal panel, for supplying gate-on voltages to the gate lines; a driving integrated circuit for driving the gate built-in circuit and supplying video signals to the data lines; and a pad region including a plurality of input/output terminals electrically connected to input/output bumps of the driving integrated circuit in the liquid crystal panel.

5 Claims, 8 Drawing Sheets

LIQUID CRYSTAL DISPLAY DEVICE WITH INTEGRATED CIRCUIT COMPRISING SIGNAL RELAY, POWERS AND SIGNAL CONTROL

This application claims the benefit of Korean Patent Application No. P2007-022367 filed March, 7, 2007 which is hereby incorporated by reference as if fully set forth herein.

BACKGROUND OF THE INVENTION

1. Field of the Invention

The present invention relates to a liquid crystal display (LCD) device, and more particularly, to a liquid crystal display device which can decrease a liquid crystal panel in size, and can reduce fabrication cost and power consumption.

2. Discussion of the Related Art

Recently, various flat panel display devices have attracted great attention. Examples include a liquid crystal display devices, field emission displays, plasma display panels, and light emitting display devices.

Among the various flat panel display devices, liquid crystal display devices display desired images by controlling light transmittance of liquid crystal with the use of an electric field applied thereto. For this, liquid crystal display devices include a liquid crystal panel having liquid crystal cells; a backlight unit to emit light to the liquid crystal panel; and a driving circuit to drive the liquid crystal cells.

The driving circuit includes a plurality of driving integrated circuits to drive the liquid crystal cells. The driving circuit may be classified into Tape Carrier Package TCP, Chip On film COF, and Chip On Glass COG according to a method of connecting the driving integrated circuits to the liquid crystal panel. Especially, in case of liquid crystal display devices using the COG method, a liquid crystal panel includes a plurality of pixel cells defined by a plurality of gate and data lines; a plurality of driving integrated circuits to drive the gate and data lines; a controller to control the driving integrated circuits by generating a control signal; a plurality of circuits films to supply the control signal from the controller to the respective driving integrated circuits; and a plurality of pad regions to electrically connect the driving integrated circuits to the gate and data lines, respectively.

The circuit films supply driving voltages and the control signal from the controller to the driving integrated circuit. At this time, each of the circuit films correspond to flexible printed circuit film, which is electrically connected to one end of each of the pad regions included in the liquid crystal panel through an anisotropic conducting film and a link line.

Since the related art liquid crystal display device includes the plurality of data and gate driving integrated circuits, the plurality of circuit films, and the controller, there is a limitation to decreasing the size and fabrication cost. In addition, the related art liquid crystal display device has a problem of high power consumption.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device which can decrease a liquid crystal panel in size, and can reduce fabrication cost and power consumption.

Additional features and advantages of the invention will be set forth in the description which follows and in part will be apparent from the description or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an LCD device includes a liquid crystal panel including a plurality of pixel cells formed at every regions defined by a plurality of data lines and gate lines; a gate built-in circuit, built-in the liquid crystal panel, for supplying gate-on voltages to the gate lines; a driving integrated circuit for driving the gate built-in circuit and supplying video signals to the data lines; and a pad region including a plurality of input/output terminals electrically connected to input/output bumps of the driving integrated circuit in the liquid crystal panel.

In another aspect of the present invention, an LCD device includes a liquid crystal panel including a plurality of pixel cells formed at every regions defined by a plurality of data lines and first and second gate lines; a first gate built-in circuit, formed at one side of the liquid crystal panel, for supplying a gate-on voltage to the first gate line; a second gate built-in circuit, formed at the other side of the liquid crystal panel, for supplying a gate-on voltage to the second gate line; a driving integrated circuit for driving the first and second gate built-in circuits and supplying video signals to the data lines; and a pad region including a plurality of input/output terminals electrically connected to input/output bumps of the driving integrated circuit in the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail embodiments of the present invention, examples of which are illustrated in the accompanying drawings. Wherever possible, the same reference numbers will be used throughout the drawings to refer to the same or like parts.

Hereinafter, a liquid crystal display device according to an embodiment of the present invention will be described with reference to the accompanying drawings.

Figure 1:
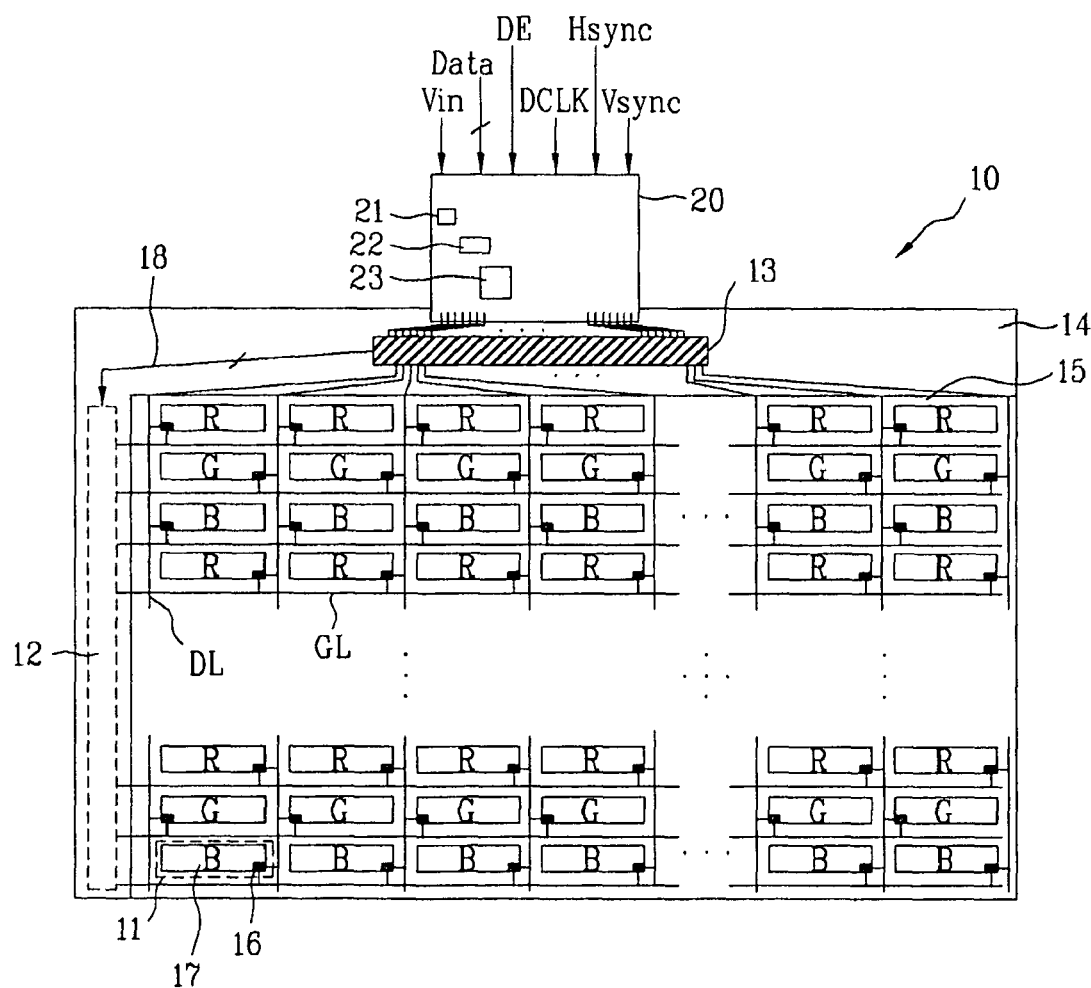
FIG. 1 is a schematic diagram illustrating a liquid crystal display device according to an embodiment of the present invention.

FIG. 1 is a schematic diagram illustrating a liquid crystal display device according to an embodiment of the present invention. As shown in FIG. 1, the liquid crystal display device according to the embodiment of the present invention includes a liquid crystal panel 10 having a plurality of pixel cells 11 defined by the crossing of a plurality of data lines DL and gate lines GL; a gate built-in circuit 12 for driving the gate lines GL, wherein the gate built-in circuit 12 is built-in the liquid crystal panel 10; a driving integrated circuit 13 for driving the gate built-in circuit 12 and supplying video signals to the data lines DL, wherein the driving integrated circuit 13 is mounted on the liquid crystal panel 10; and a flexible printed circuit 20, attached to the liquid crystal panel 10, for connecting the liquid crystal panel 10 to an external driving system (not shown). As illustrated, the pixel cells 11 may include three colors alternately arranged along the data line direction (vertical direction), while pixels of the same color are arranged along the gate line direction (horizontal direction) near each gate line.

The liquid crystal panel 10 includes a lower substrate 14 and an upper substrate 15 bonded facing each other; spacers (not shown) for maintaining a constant cell gap between the lower and upper substrates 14 and 15; and a liquid crystal layer (not shown) filled in a liquid crystal space provided by the spacers.

The lower substrate 14 includes a display region that corresponds to the upper substrate 15, and a non-display region that excludes the display region. In the display region of the lower substrate 14, a plurality of data lines DL are formed at predetermined intervals parallel to each other along a first direction; a plurality of gate lines GL are formed at predetermined intervals parallel to each other along a second direction; and the pixel cells 11 are formed in the regions defined by the crossings of the plurality of data lines DL and gate lines GL. In this case, the first direction may be perpendicular to the second direction. The number of the data lines DL supplied with the video signal is smaller than the number of the gate lines GL supplied with gate-on voltages.

Each of the pixel cells 11 includes a thin film transistor 16 connected both to the gate line GL and the data line DL; and a pixel electrode 17 connected to the thin film transistor 16. Each thin film transistor 16 includes a gate electrode connected to the gate line GL; a source electrode connected to the data line DL; and a drain electrode connected to the pixel electrode 17. Along a data line direction, the thin film transistors 16 are arranged alternately in the opposite pixel cells 11. That is, the thin film transistors 16 positioned in the two pixel cells 11 adjacent at a vertical direction along the data line DL are connected to the different data lines DL. Accordingly, the thin film transistors 16 connected to the odd-numbered gate line GL2n−1 supply the video signal from the first to 'm'th data lines DL1 to DLm to the pixel electrodes 17, respectively. Also, the thin film transistors 16 connected to the even-numbered gate line GL2n supply the video signal from the second to 'm+1'th data lines DL2 to DLm+1 to the pixel electrodes 17, respectively.

The pixel electrode 17 has a short side parallel to the data line DL and a long side parallel to the gate line, wherein the short side is shorter than the long side. Accordingly, the pixel electrodes 17 may form horizontal stripes.

In the non-display region of the lower substrate 14, the gate built-in circuit 12 is connected to each of the plurality of the gate lines GL; and the driving integrated circuit 13 formed therein.

The upper substrate 15 includes color filters, a common electrode and a light shielding layer. The common electrode may be formed on the lower substrate 14 depending on the operating mode of the liquid crystals of the liquid crystal layer. The color filters include a red R color filter, a green G color filter, and a blue B color filter. The color filters are arranged so that red R, green G, and blue B color filters are alternately arranged along the data line DL direction, while color filters of the same color are arranged along the gate line GL direction at each gate line.

The common electrode may be formed over the entire upper substrate 15 or in shape of lines opposite to the pixel electrode 17 for forming a vertical electric field across the liquid crystal layer. Alternatively, the common electrode may be formed on the lower substrate 14 as electrodes parallel to the pixel electrodes 17 for forming a horizontal electric field across the liquid crystal layer.

The light shielding layer is formed on the upper substrate 15 to overlap regions of the pixel regions excluding aperture regions overlapping the pixel electrodes 17. The red R, green G, and blue B pixel cells respectively on the red R color filter, the green G color filter, and the blue B color filter constitute one unit pixel for a color picture.

The flexible printed circuit 20 is provided in the non-display region of the lower substrate 14 and attached to a pad portion of the lower substrate 14. The flexible printed circuit 20 transmits a source data signal Data, and synchronizing signals DE, DCLK, Hsync, and Vsync from a driving system to the driving integrated circuit 13.

The driving integrated circuit 13 is formed in an integrated circuit forming portion having a plurality of input/output pads at the non-display region of the lower substrate 14. The driving integrated circuit 13 may include a plurality of input/output bumps to be electrically connected to the input/output pads at the integrated circuit forming portion, respectively. At this time, the electric connection between the pad portion and the input/output bumps of the driving integrated circuit 13 will be explained with reference to the accompanying drawings, as follows.

The driving integrated circuit 13 generates a gate driving signal and a data control signal to divide one horizontal period corresponding to one period of the horizontal synchronizing signal Hsync into first to third sub-periods by using at least one of the synchronizing signals DE, DCLK, Hsync, and Vsync received from the flexible printed circuit 20.

The driving integrated circuit 13 aligns the source data signals Data in order of red R, green G and blue B data corresponding to the first to third sub-periods; converts the aligned data into video signals corresponding to analog signals; and supplies the video signals to the data lines DL.

Figure 2:
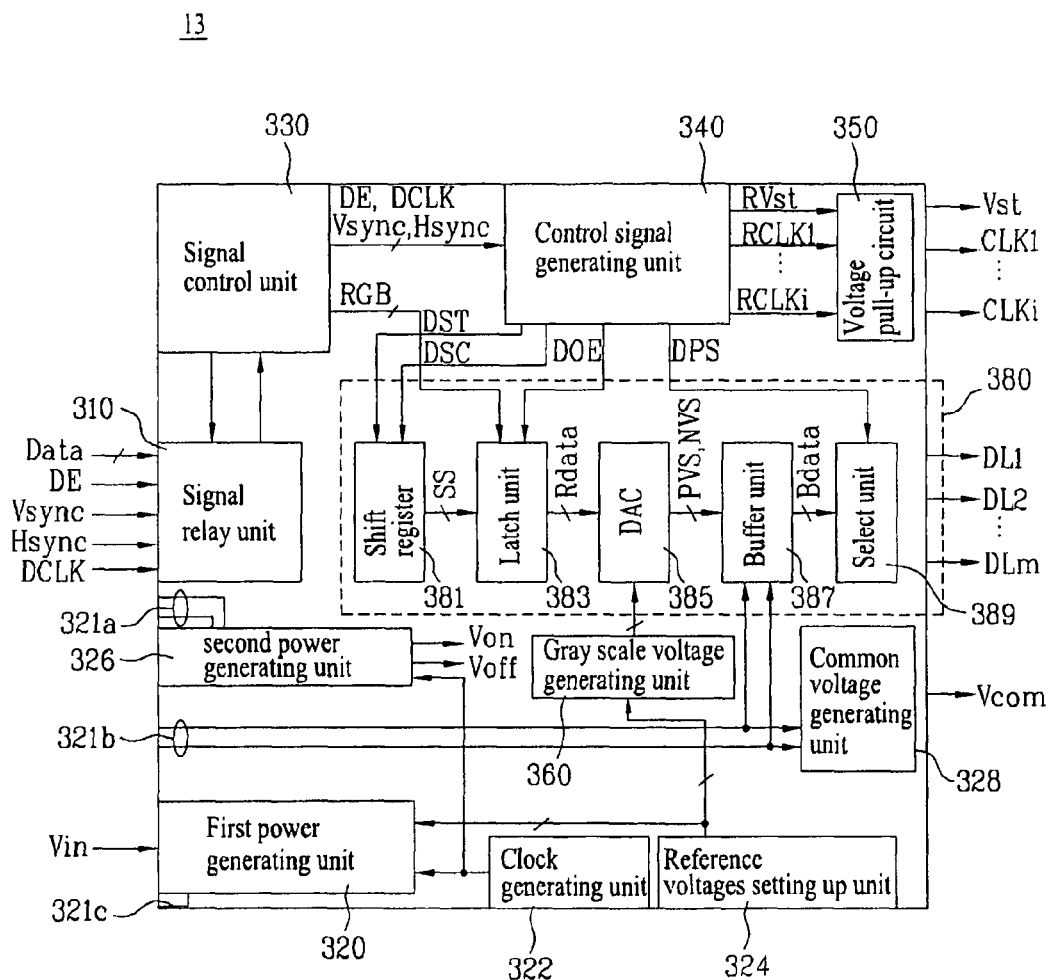
FIG. 2 is a block diagram illustrating a driving integrated circuit shown in FIG. 1.

FIG. 2 is a schematic diagram illustrating the driving integrated circuit shown in FIG. 1. The driving integrated circuit shown in FIG. 2 includes a signal relay unit 310, a first power generating unit 320, a clock generating unit 322, a reference voltage setting up unit 324, a second power generating unit 326, a signal control unit 330, a control signal generating unit 340, a voltage pull-up circuit 350, a gray scale voltage generating unit 360, and a data converting unit 380.

The signal relay unit 310 relays the source data signal Data and the synchronizing signals DE, DCLK, Hsync, and Vsync from the flexible printed circuit 20 to the signal control unit 330.

The clock generating unit 322 generates clock signals for driving the first and second power generating units 320 and 326.

The first power generating unit 320 generates a first power, i.e., first and second reference voltages VSP and VSN by using an input power Vin from the flexible printed circuit 20 and using the clock signal from the clock generating unit 322. In addition, passive elements, such as a resistor 21, a capacitor 22 and an inductor 23 in the flexible printed circuit 20 are connected to the first power generating unit 320 through power signal lines 321a, 321b, and 321c, and used for biasing the first and second reference voltages VSP and VSN generated at the first power generating unit 320 or setting up option functions of the driving integrated circuit 13.

The second power generating unit 326 generates a second power, i.e., first and second driving voltages Vdd and Vss, an integrated circuit driving voltage Vcc, a gate-on voltage Von and a gate-off voltage Voff, required for driving the liquid crystal panel 10 by using the first and second reference voltages VSP and VSN generated at the first power generating unit 320.

The reference voltage setting up unit 324 sets up levels of the first and second reference voltages VSP and VSN to be supplied to the gray scale voltage generating unit 360 from the first power generating unit 320. The common voltage generating unit 328 generates a common voltage Vcom to be supplied to the common electrode of the liquid crystal panel 10 by using the first and second driving voltages Vdd and Vss supplied to the passive elements on the flexible printed circuit 20 from the second power generating unit 326. The flexible printed circuit 20 includes a common voltage varying unit (not shown) for varying the common voltage Vcom generated at the common voltage generating unit 328 by using at least one of resistor and capacitor (not shown).

The signal control unit 330 controls driving of the signal relay unit 310, and also controls the internal circuit block of driving integrated circuit 13.

Figure 3:
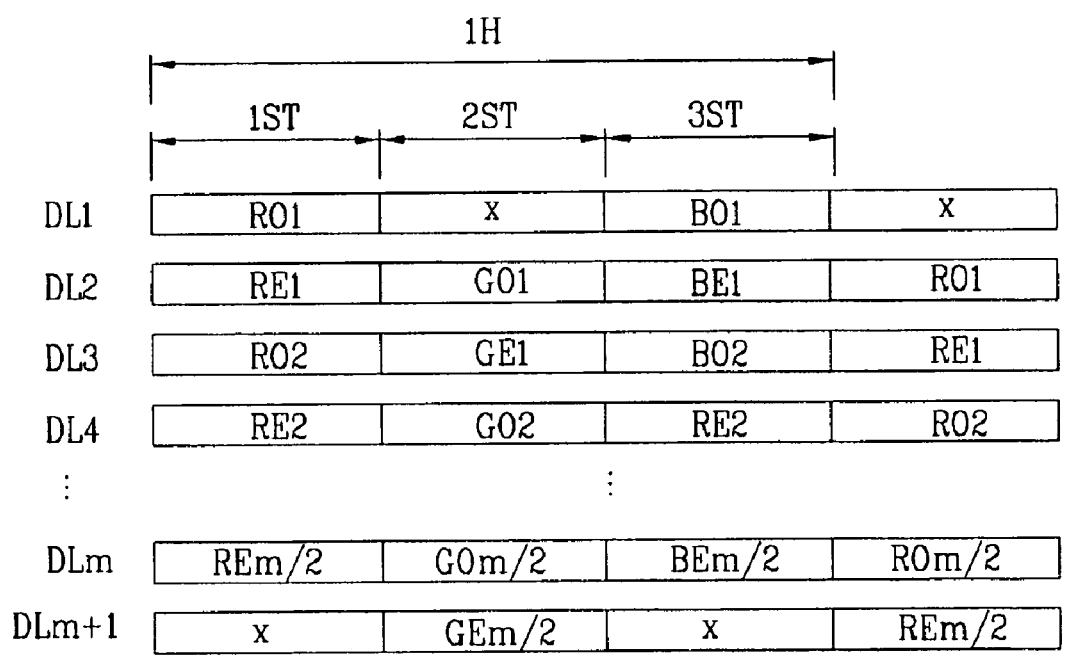
FIG. 3 is a diagram illustrating a data signal aligned by a signal control unit shown in FIG. 2.

As shown in FIG. 3, the signal control unit 330 aligns the source data signal Data supplied from the signal relay unit 310 to be suitable for the driving of the liquid crystal panel 10, and supplies the aligned data RGB to the data converting unit 380.

In more detail, the signal control unit 330 aligns the source data signal Data for one horizontal period from the signal relay unit 310 in an order of the red R, green G and blue B data corresponding to the first to third sub-periods.

Also, the signal control unit 330 re-aligns the aligned red data R into odd-numbered red data RO1 to ROm/2 to be supplied to the odd-numbered data lines DL1, DL3, . . . , DLm−1, and even-numbered red data RE1 to REm/2 to be supplied to the even-numbered data lines DL2, DL4, . . . , DLm among the first to 'm'th data lines DL1 to DLm during the first sub-period 1ST of one horizontal period.

Then, the signal control unit 330 re-aligns the aligned green data G into odd-numbered green data GO1 to GOm/2 to be supplied to the even-numbered data lines DL2, DL4, . . . , DLm and even-numbered green data GE1 to GEm/2 to be supplied to the odd-numbered data lines DL3, DL5, . . . , DLm+1 among the second to 'm+1'th data lines DL2 to DLm+1 during the second sub-period 2ST of one horizontal period.

The second control unit 330 re-aligns the aligned blue data B into odd-numbered blue data BO1 to BLm/2 to be supplied to the odd-numbered data lines DL1, DL3, . . . , DLm−1 and even-numbered blue data BE1 to BEm/2 to be supplied to the even-numbered data lines DL2, DL4, . . . , DLm among the first to 'm'th data lines DL1 to DLm during the third sub-period 3ST of one horizontal period.

Also, the signal control unit 330 supplies the synchronizing signals DE, DCLK, Hsync, and Vsync from the signal relay unit 310 to the control signal generating unit 340.

The control signal generating unit 340 generates data control signals DST, DSC, DOE, and DPS, and gate driving signals RVst, and RCLK1 to RCLKi by using at least one of the synchronizing signals DE, DCLK, Hsync, and Vsync from the signal control unit 330.

The data control signals DST, DSC, DOE, and DPS includes a data start signal DST, a data shift clock DSC, a data output enable DOE, and a data polarity signal DPS for controlling the data converting unit 380. The control signal generating unit 340 generates the data polarity signal DPS that inverts the polarity of the video signals in the unit of frame and supplies the video signals having the different polarities to the adjacent data lines DL. That is, the control signal generating unit 340 generates the data polarity signal DSP of column inversion method that inverts the polarity of video signal in the unit of data line as well as in the unit of frame.

The gate driving signal RVst, and RCLK1 to RCLKi includes a gate start signal RVst and first to (i)th clock signals RCLK1 to RCLKi for driving the gate built-in circuit 12. The first to (i)th clock signals RCLK1 to RCLKi have phases delayed in sequence so that the first to (i)th clock signals RCLK1 to RCLKi are made to have pulse widths for turning on the thin film transistors 16 in each of the sub-periods, respectively. The first to (i)th clock signals RCLK1 to RCLKi may have any one of two, four, six, eight, or ten phases depending on the design of the gate built-in circuit 12.

The voltage pull-up circuit 350 pulls up voltage levels of the gate driving signals RVst, and RCLK1 to RCLKi supplied from the control signal generating unit 340 by using the gate-on voltage Von and the gate-off voltage Voff supplied from the second power generating unit 326. The gate-on voltage Von is a voltage for turning on the thin film transistor 16 of each pixel cell 11, and the gate-off voltage Voff is a voltage for turning off the thin film transistor 16 of each pixel cell 11. The voltage pull-up circuit 350 supplies the gate driving signals Vst, and CLK1 to CLKi pulled up through a gate driving signal transmission line 18 at the non-display region of the lower substrate 14 to the gate built-in circuit 12.

The gray scale voltage generating unit 360 subdivides the first and second reference voltages VSP and VSN from the first power generating unit 320, to generate a plurality of gray scale voltages and supply the plurality of gray scale voltages to the data converting unit 380. The plurality of gray scale voltages generate 2N positive (+) polarity gray scale voltages and 2N negative (−) polarity gray scale voltages, if the source data signal Data has N bits.

The data converting unit 380 includes a shift register 381, a latch unit 383, a digital-analog converting unit 385, a buffer unit 387, and a select unit 389.

The shift register 381 shifts the data start signal DST in sequence in response to the data shift clock DSC from the control signal generating unit 340, to generate a shift signal SS. At this time, the shift register 381 may be a bidirectional shift register that is driven in opposite directions in accordance with a directional signal from the signal control unit 330.

The latch unit 383 latches the data RGB of one horizontal line from the signal control unit 330 in sequence in response to the shift signal SS from the shift register 381. In addition, the latch unit 383 supplies the latched data RData of one horizontal line to the digital-analog converting unit 385 in response to the data output signal DOE from the control signal generating unit 340.

The digital-analog converting unit 385 converts the latched data RData supplied from the latch unit 383 into positive polarity and negative polarity video signals PVS and NVS corresponding to analog signals by using the plurality of positive polarity gray scale voltages and negative polarity gray scale voltages from the gray scale voltage generating unit 360. The digital-analog converting unit 385 selects one gray scale voltage corresponding to a gray scale value of the latched data RData from the plurality of positive polarity gray scale voltages as the positive polarity video signal PVS, and one gray scale voltage corresponding to a gray scale value of the latched data RData from the plurality of negative polarity gray scale voltages as the negative polarity video signal NVS.

The buffer unit 387 buffers the positive polarity and negative polarity video signals PVS and NVS by using first and second driving voltages Vdd and Vss through the passive elements of the flexible printed circuit 20 from the first power generating unit 320. For example, the buffer unit 387 amplifies the positive polarity and negative polarity video signals PVS and NVS to a level suitable for driving a load on the data lines DL.

The select unit 389 selects the positive polarity or negative polarity video signal PVS or NVS supplied from the buffer unit 387 in response to the data polarity signal DPS from the control signal generating unit 340, and supplies the selected video signal to the data lines DL through first to 'm+1'th output channels. That is, the polarity of the video signal selected and output by the select unit 389 is inverted in the unit of output channel as well as in the unit of frame, in response to the data polarity signal DPS.

Referring to FIG. 1, the gate built-in circuit 12 is formed at the non-display region of the lower substrate 14 concurrently with a process for forming the thin film transistors 16 and the gate built-in circuit 12 is connected to the plurality of gate lines GL. The gate built-in circuit 12 generates the gate-on voltage Von at every sub-period in response to pulled up gate driving signals Vst, and CLK1 to CLKi supplied from the driving integrated circuit 13, and supplies the gate-on voltage Von to the gate lines GL in sequence. For example, the driving integrated circuit 13 supplies the pulled up gate driving signals Vst, and CLK1 to CLKi to the gate built-in circuit 12 through the plurality of gate driving signal transmission lines 18 formed at the non-display region of the lower substrate 14.

Figure 4:
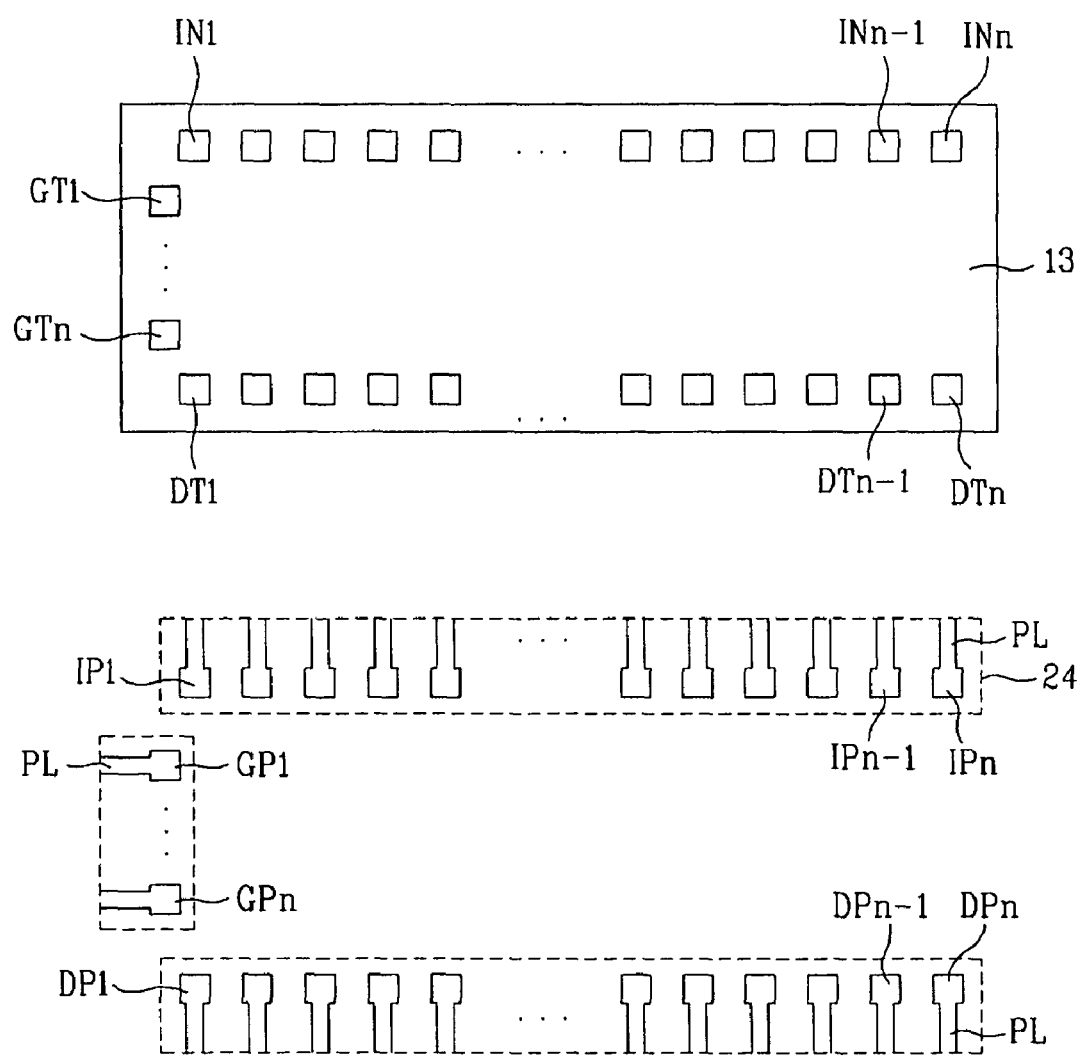
FIG. 4 is a schematic diagram illustrating a pad region and input/output bumps of a driving integrated circuit according to an embodiment of the present invention.

FIG. 4 is a schematic diagram illustrating a pad region and input/output bumps of a driving integrated circuit according to an embodiment of the present invention.

The driving integrated circuit 13 shown in FIG. 4 includes a plurality of input bumps IN1 to INn having the input power Vin, the source data signal Data, and the synchronizing signals DE, DCLK, Hsync, and Vsync input through the flexible printed circuit 20; a plurality of output bumps GT1 to GTn to output the gate driving signals Vst, and CLK1 to CLKi; and a plurality of data output bumps DT1 to DTn to supply the video signal and the common voltage Vcom to the data lines DL1 to DLm and the common electrode, respectively.

The respective input bumps IN1 to INn are positioned nearest to a first circumference of the driving integrated circuit 13 that corresponds to one long side at a direction of the flexible printed circuit 20. Also, the data output bumps DT1 to DTn are positioned nearest to a second circumference of the driving integrated circuit 13 that corresponds to the other long side at the direction of the flexible printed circuit 20. The gate output bumps GT1 to GTn are positioned nearest to a third circumference having no the input bumps IN1 to INn and data output bumps DT1 to DTn, that is, nearest to one short side at a direction of the gate driving circuit 12.

The pad region 24 shown in FIG. 4 includes a plurality of input connection terminals IP1 to IPn electrically connected to the input bumps IN1 to INn of the driving integrated circuit 13; a plurality of gate connection terminals GP1 to GPn electrically connected to the plurality of gate output bumps GT1 to GTn, respectively; and a plurality of data connection terminals DP1 to DPn electrically connected to the plurality of data output bumps DT1 to DTn, respectively. The plurality of input connection terminals IP1 to IPn, the gate connection terminals GP1 to GPn, and the data connection terminals DP1 to DPn may be formed as one body with signal transmission patterns PL.

Figure 5:
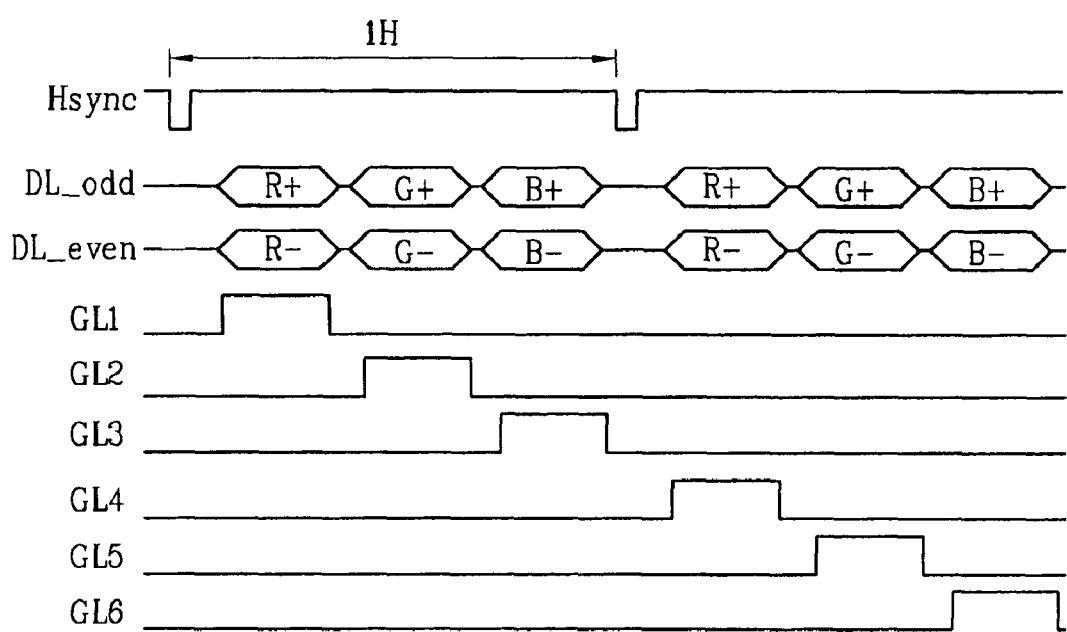
FIG. 5 is a waveform diagram illustrating a driving method of liquid crystal display device according to an embodiment of the present invention.

FIG. 5 is a waveform diagram illustrating a driving method of liquid crystal display device according to an embodiment of the present invention.

A method of driving the liquid crystal display device according to the embodiment of the present invention will be explained with reference to FIG. 5 in association with FIG. 1.

During the first sub-period of the first horizontal period, and in synchronization with the supply of the gate-on voltage to the first gate line GL1, the positive (+) polarity red video signal R+ is supplied to the odd-numbered data lines DL_odd among the first to 'm' th data lines DL1 to DLm, and the negative (−) polarity red video signal R− is supplied to the even-numbered data lines DL_even among the first to 'm' th data lines DL1 to DLm. Thus, the odd-numbered pixel cells 11 of the first horizontal line display red video corresponding to the positive (+) polarity red video signal R+, and the even-numbered pixel cells 11 of the first horizontal line display red video corresponding to the negative (−) polarity red video signal R−.

During the second sub-period of the first horizontal period, and in synchronization with the supply of the gate-on voltage to the second gate line GL2, the positive (+) polarity green video signal G+ is supplied to the odd-numbered data lines DL_odd among the second to 'm+1 'th data lines DL2 to DLm+1, and the negative (−) polarity green video signal G− is supplied to the even-numbered data lines DL_even among the second to 'm+1'th data lines DL1 to DLm. Thus, the odd-numbered pixel cells 11 of the second horizontal line display green video corresponding to the negative (−) polarity green video signal G−, and the even-numbered pixel cells 11 of the second horizontal line display green video corresponding to the positive (+) polarity green video signal G+. At this time, the polarity of video signal displayed in the pixel cells 11 of the first horizontal line is different from the polarity of video signal displayed in the pixel cells 11 of the second horizontal line being adjacent to the first horizontal line in the vertical direction.

During the third sub-period of the first horizontal period, and in synchronization with the supply of the gate-on voltage to the third gate line GL3, the positive (+) polarity blue video signal B+ is supplied to the odd-numbered data lines DL_odd among the first to 'm' th data lines DL1 to DLm, and the negative (−) polarity blue video signal B− is supplied to the even-numbered data lines DL_even among the first to 'm' th data lines DL1 to DLm. Thus, the odd-numbered pixel cells 11 of the third horizontal line display blue video corresponding to the positive (+) polarity blue video signal B+, and the even-numbered pixel cells 11 of the third horizontal line display blue video corresponding to the negative (−) polarity blue video signal B−. At this time, the polarity of video signal displayed in the pixel cells 11 of the second horizontal line is different from the polarity of video signal displayed in the pixel cells 11 of the third horizontal line being adjacent to the second horizontal line in the vertical direction.

As a result, during the first horizontal period divided into the first to third sub-periods, one color picture is displayed by mixing the red, green and blue videos corresponding to the respective sub-periods in sequence.

After the first horizontal period, the pixel cells of each horizontal period display color video according to the same method as that of the first horizontal period. Also, the polarity pattern of the video signal supplied to the liquid crystal panel 10 is inverted in the unit of frame.

Accordingly, the thin film transistors 16 are arranged alternately in the opposite pixel cells 11 along the data line direction. In this respect, the polarity pattern of column inversion method supplied to the liquid crystal panel 10 from the driving integrated circuit 13 may be displayed as the polarity pattern of dot inversion method.

Figure 6:
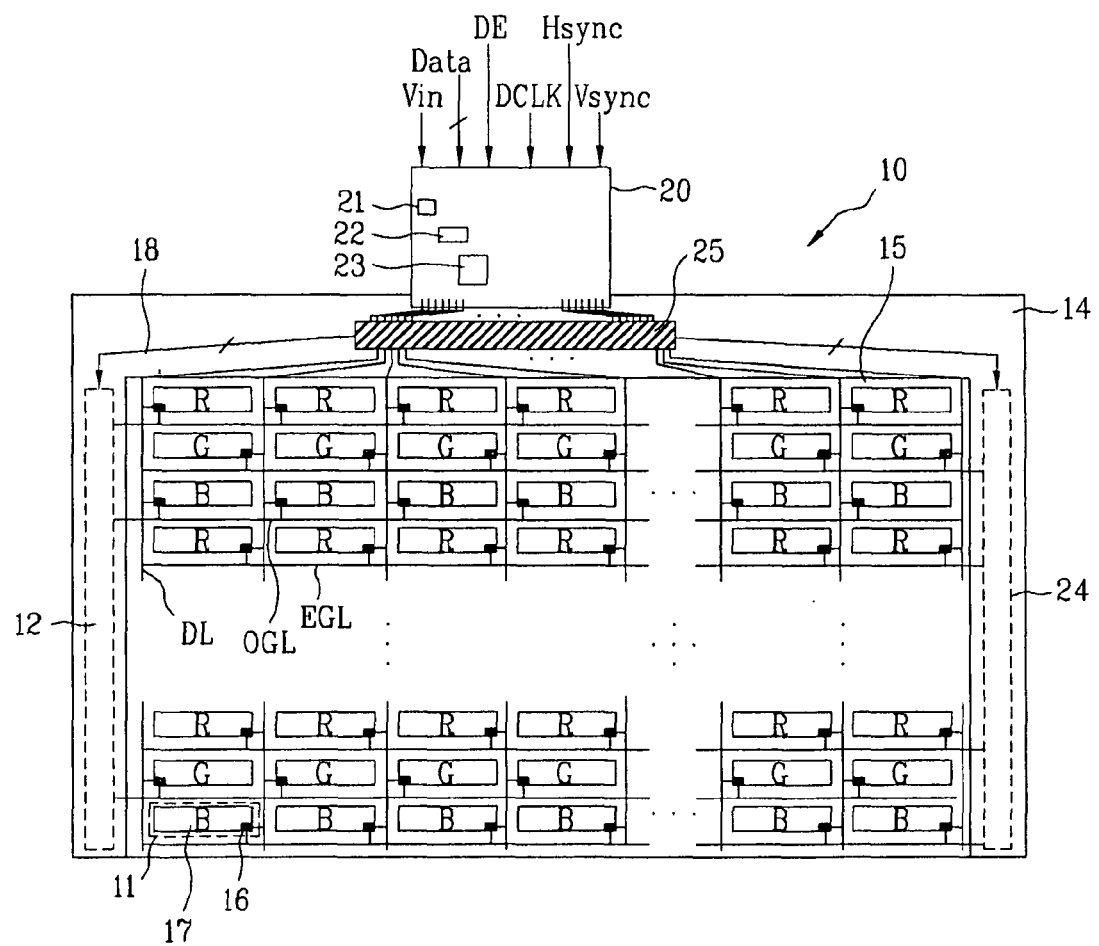
FIG. 6 is a schematic diagram illustrating a liquid crystal display device according to another embodiment of the present invention.

FIG. 6 is a schematic diagram illustrating a liquid crystal display device according to another embodiment of the present invention.

The liquid crystal display device shown in FIG. 6 includes a first gate built-in circuit 12, formed at one side of a liquid crystal panel 10, for driving a plurality of odd-numbered gate lines OGL; a second gate built-in circuit 26, formed at the other side of the liquid crystal panel 10, for driving a plurality of even-numbered gate lines EGL; and a driving integrated circuit 25, mounted on the liquid crystal panel, for driving the first and second gate built-in circuits 12 and 26, and supplying video signals to data lines DL. Except for the first and second gate built-in circuits 12 and 26 and the driving integrated circuit 25, the other components are identical to those included in the liquid crystal display device shown in FIG. 1. Thus, the explanation for the same parts will be substituted by that of FIG. 1 using the same reference numbers.

Figure 7:
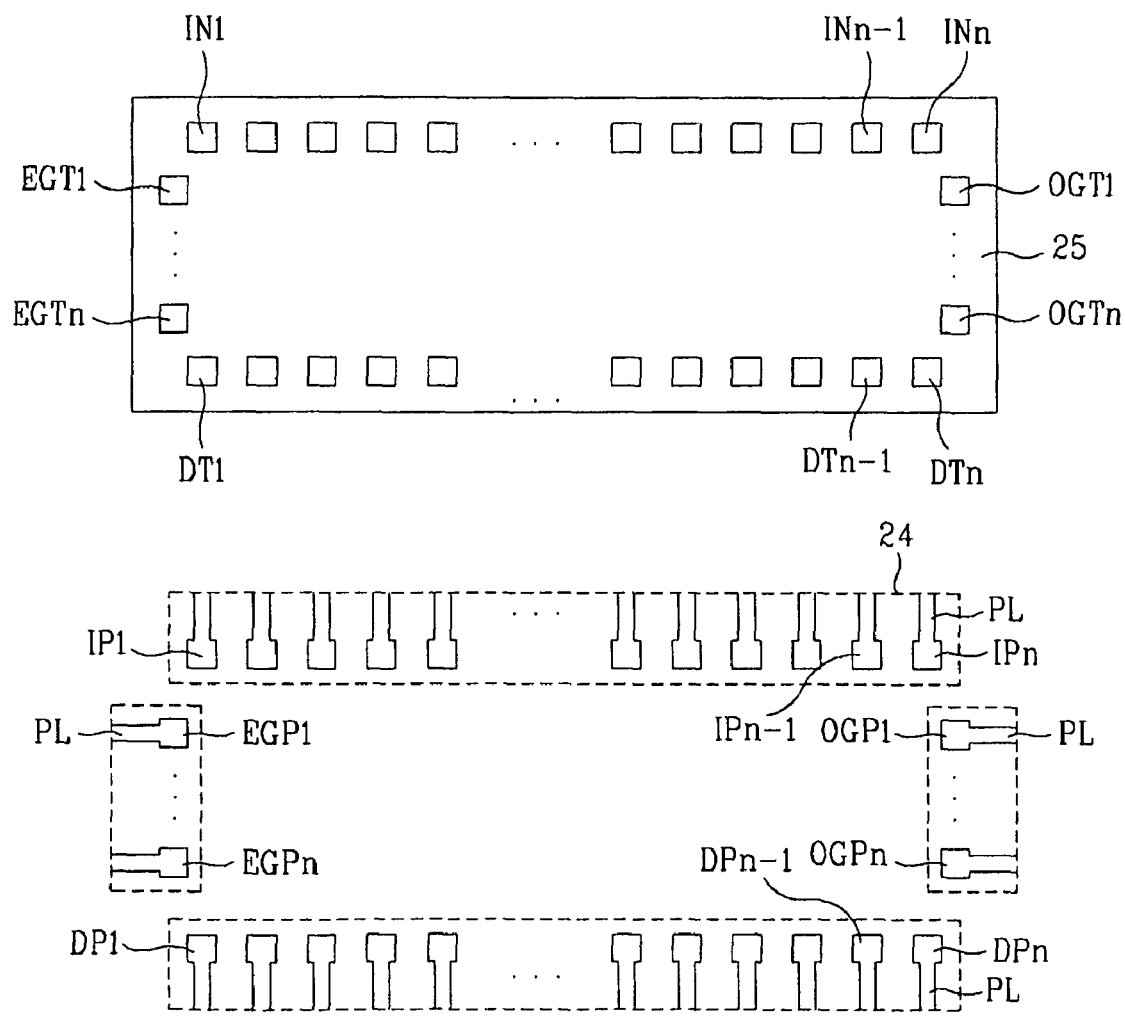
FIG. 7 is a schematic diagram illustrating a pad region and input/output bumps of a driving integrated circuit according to another embodiment of the present invention.

As shown in FIG. 7, the driving integrated circuit 25 includes a plurality of input bumps IN1 to INn having the input power Vin, the source data signal Data, and the synchronizing signals DE, DCLK, Hsync, and Vsync input through the flexible printed circuit 20; a plurality of first gate output bumps EGT1 to EGTn to output first gate driving signals Vst1, and CLK1 to CLKi to the first gate built-in circuit 12; a plurality of second gate output bumps OGT1 to OGTn to output second gate driving signals Vst2, and CLK1 to CLKi to the second gate built-in circuit 26; and a plurality of data output bumps DT1 to DTn to supply the video signal and common voltage Vcom to the data lines DL1 to DLm and common electrode, respectively.

The respective input bumps IN1 to INn are positioned nearest to a first circumference of the driving integrated circuit 25 that corresponds to one long side at a direction of the flexible printed circuit 20. Also, the data output bumps DT1 to DTn are positioned nearest to a second circumference of the driving integrated circuit 25 that corresponds to the other long side at the direction of the flexible printed circuit 20. The first gate output bumps EGT1 to EGTn are positioned nearest to a third circumference having no the input bumps IN1 to INn and data output bumps DT1 to DTn, that is, nearest to one short side at a direction of the gate driving circuit 12. The second gate output bumps OGT1 to OGTn are positioned nearest to a fourth circumference of the driving integrated circuit 25 that corresponds to an adjacent direction to the second gate driving circuit 26.

The pad region 24 shown in FIG. 7 includes a plurality of input connection terminals IP1 to IPn electrically connected to the input bumps IN1 to INn of the driving integrated circuit 25; a plurality of first gate connection terminals EGT1 to EGTn electrically connected to the plurality of first gate output bumps EGT1 to EGTn, respectively; a plurality of second gate connection terminals OGP1 to OGPn electrically connected to the plurality of second gate output bumps, respectively; and a plurality of data connection terminals DP1 to DPn electrically connected to the plurality of data output bumps DT1 to DTn, respectively. The plurality of input connection terminals IP1 to IPn, first gate connection terminals EGP1 to EGPn, second gate connection terminals OGP1 to OGPn, and data connection terminals DP1 to DPn may be formed as one body with signal transmission patterns PL.

Figure 8:
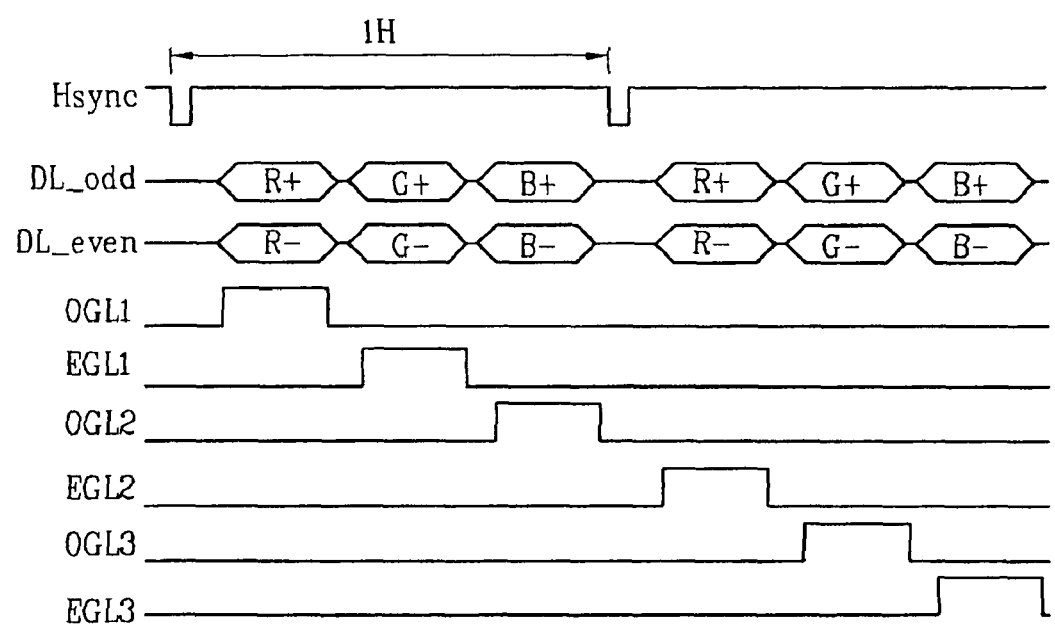
FIG. 8 is a waveform diagram illustrating a driving method of liquid crystal display device according to another embodiment of the present invention.

FIG. 8 is a waveform diagram illustrating a driving method of liquid crystal display device according to another embodiment of the present invention.

A method of driving the liquid crystal display device according to another embodiment of the present invention will be explained with reference to FIG. 8 in association with FIG. 6.

During the first sub-period of the first horizontal period, and in synchronization with the supply of the gate-on voltage to the first odd-numbered gate line OGL1, the positive (+) polarity red video signal R+ is supplied to the odd-numbered data lines DL_odd among the first to 'm'th data lines DL1 to DLm, and the negative (−) polarity red video signal R− is supplied to the even-numbered data lines DL_even among the first to 'm'th data lines DL1 to DLm. Thus, the odd-numbered pixel cells 11 of the first horizontal line display red video corresponding to the positive (+) polarity red video signal R+, and the even-numbered pixel cells 11 of the first horizontal line display red video corresponding to the negative (−) polarity red video signal R−.

During the second sub-period of the first horizontal period, and in synchronization with the supply of the gate-on voltage to the first even-numbered gate line EGL1, the positive (+) polarity green video signal G+ is supplied to the odd-numbered data lines DL_odd among the second to 'm+1'th data lines DL2 to DLm+1, and the negative (−) polarity green video signal G− is supplied to the even-numbered data lines DL_even among the first to 'm'th data lines DL1 to DLm. Thus, the odd-numbered pixel cells 11 of the second horizontal line display green video corresponding to the positive (+) polarity green video signal G+, and the even-numbered pixel cells 11 of the second horizontal line display green video corresponding to the negative (−) polarity green video signal G−. At this time, the polarity of video signal displayed in the pixel cells 11 of the first horizontal line is different from the polarity of video signal displayed in the pixel cells 11 of the second horizontal line being adjacent to the first horizontal line in the vertical direction.

During the third sub-period of the first horizontal period, and in synchronization with the supply of the gate-on voltage to the second odd-numbered gate line OGL2, the positive (+) polarity blue video signal B+ is supplied to the odd-numbered data lines DL_odd among the first to 'm' th data lines DL1 to DLm, and the negative (−) polarity blue video signal B− is supplied to the even-numbered data lines DL_even among the first to 'm'th data lines DL1 to DLm. Thus, the odd-numbered pixel cells 11 of the third horizontal line display blue video corresponding to the positive (+) polarity blue video signal B+, and the even-numbered pixel cells 11 of the third horizontal line display blue video corresponding to the negative (−) polarity blue video signal B−. At this time, the polarity of video signal displayed in the pixel cells 11 of the second horizontal line is different from the polarity of video signal displayed in the pixel cells 11 of the third horizontal line being adjacent to the second horizontal line in the vertical direction.

As a result, during the first horizontal period divided into the first to third sub-periods, one color picture is displayed by mixing the red, green and blue videos corresponding to the respective sub-periods in sequence.

After the first horizontal period, the pixel cells of each horizontal period display color video according to the same method as that of the first horizontal period. Also, the polarity pattern of the video signal supplied to the liquid crystal panel 10 is inverted in the unit of frame.

Accordingly, the thin film transistors 16 are arranged alternately in the opposite pixel cells 11 along the data line direction. In this respect, the polarity pattern of column inversion method supplied to the liquid crystal panel 10 from the driving integrated circuit 25 may be displayed as the polarity pattern of dot inversion method.

According as the liquid crystal panel 10 is driven by one driving integrated circuit 25 that is built in the liquid crystal panel 10, it is possible to reduce the unit cost and to minimize the thickness of the liquid crystal display device. Also, the plurality of input/output bumps IN1 to Inn are arranged along the circumferences of the driving integrated circuit 25, thereby minimizing the size of liquid crystal display device.

As mentioned above, the liquid crystal display device according to embodiments of the present invention have the following advantages.

First, the liquid crystal panel is driven by one driving integrated circuit that is built in the liquid crystal panel, so that it is possible to reduce the unit cost and to minimize the thickness of the liquid crystal display device.

Also, the plurality of input/output bumps IN1 to Inn are arranged along the circumferences of the driving integrated circuit, thereby minimizing the size of liquid crystal display device.

Further, the polarity of video signal is inverted in the unit of frame as well as in the unit of data line, thereby decreasing the power consumption.

In addition, the arrangement of the pixel cells of a single color along the horizontal direction permits a reduction in number of data lines by a third (⅓).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device comprising:
   a liquid crystal panel including a plurality of pixel cells formed at every regions defined by a plurality of data lines and gate lines;
   a gate built-in circuit, built-in the liquid crystal panel, for supplying gate-on voltages to the gate lines;
   a driving integrated circuit for driving the gate built-in circuit and supplying video signals to the data lines; and
   a pad region including a plurality of input/output terminals electrically connected to input/output bumps of the driving integrated circuit in the liquid crystal panel,
   wherein the driving integrated circuit comprises a signal relay unit to relay a source data signal and synchronizing signals from the external driving system through the flexible printed circuit,
   a first power generating unit to generate a first power,
   a second power generating unit to generate a second power by using the first power,
   a signal control unit to align the source data signal supplied from the signal relay unit to be suitable for the driving of the liquid crystal panel, and to control the inside of driving integrated circuit,
   a control signal generating unit to generate data control signals and gate driving signals for driving the gate built-in circuit by using the synchronizing signals supplied through the signal control unit.

2. The LCD device of claim 1, wherein the input/output bumps include:
   a plurality of input bumps for receiving at least one of an input power, a source data signal and synchronizing signals from the external;
   a plurality of gate output bumps for outputting gate driving signals to the gate built-in circuit; and
   a plurality of data output bumps for supplying the video signals and a common voltage to the data lines and a common electrode, respectively.

3. The LCD device of claim 2, wherein the input/output bumps include:
   a plurality of input bumps arranged nearest to a first circumference that corresponds to one long side of the driving integrated circuit;
   a plurality of data output bumps arranged nearest to a second circumference that corresponds to the other long side of the driving integrated circuit; and
   a plurality of gate output bumps arranged nearest to a third circumference having no input bumps and data output bumps provided there along.

4. The LCD device of claim 3, wherein the pad region includes:
   a plurality of input connection terminals electrically connected to the input bumps, respectively;
   a plurality of gate connection terminals electrically connected to the gate output bumps, respectively; and
   a plurality of data connection terminals electrically connected to the data output bumps, respectively.

5. The LCD device of claim 4, wherein the input connection terminals, the gate connection terminals and the data connection terminals are formed as one body with signal transmission patterns.

* * * * *